United States Patent [19]

Hudson

[11] Patent Number: 4,516,796
[45] Date of Patent: May 14, 1985

[54] FLUID COUPLING

[75] Inventor: Steven L. Hudson, Howell, Mich.

[73] Assignee: The Estate of Thomas S. Krause, Howell, Mich.

[21] Appl. No.: 479,684

[22] Filed: Mar. 28, 1983

[51] Int. Cl.³ ............................................. F16L 39/00
[52] U.S. Cl. .................................. 285/321; 285/347; 285/351; 285/384
[58] Field of Search ............... 285/353, 356, 387, 347, 285/388, 393, 386, 384, 21, 321, 351

[56] References Cited

U.S. PATENT DOCUMENTS

| 770,525 | 9/1904 | Hussey . |
| 1,754,369 | 6/1927 | Meyer . |
| 1,861,314 | 5/1932 | McAndrew . |
| 2,013,732 | 9/1935 | Marvin . |
| 2,226,826 | 12/1940 | Miller . |
| 2,429,782 | 10/1947 | Versoy . |
| 2,480,174 | 8/1949 | Yost . |
| 2,481,404 | 9/1949 | Donner . |
| 2,599,389 | 6/1952 | Hume .............................. 285/351 X |
| 2,642,297 | 6/1953 | Hanna . |
| 2,907,590 | 10/1959 | Oswald . |
| 2,926,935 | 3/1960 | La Marre . |
| 2,952,482 | 9/1960 | Torres . |
| 3,129,777 | 4/1964 | Haspert . |
| 3,540,760 | 11/1970 | Miller . |
| 3,718,350 | 2/1973 | Klein . |
| 4,066,281 | 1/1978 | DeBonis .............................. 285/31 |
| 4,133,564 | 1/1979 | Sarson . |
| 4,193,616 | 3/1980 | Sarson . |
| 4,239,262 | 12/1980 | Krupp . |
| 4,448,447 | 5/1984 | Funk et al. ...................... 285/321 X |

FOREIGN PATENT DOCUMENTS

| 1308769 | 10/1962 | France . |
| 385577 | 3/1965 | Switzerland . |
| 1083777 | 9/1965 | United Kingdom . |

Primary Examiner—Dave W. Arola
Attorney, Agent, or Firm—Ian C. McLeod

[57] ABSTRACT

A fluid coupling is described. The coupling includes a connector means (12, 22) threaded (12C, 22C) for connection and rotatably mounted on conduit means (10, 20) during installation and in use. The connector means can be turned into a corresponding threaded opening, particularly an opening located in a position which allows restricted rotational movement of the conduit means. The coupling is particularly adapted for use on vehicles where limited space and weight are important factors.

10 Claims, 6 Drawing Figures

FLUID COUPLING

SUMMARY OF THE INVENTION

The present invention relates to an improved fluid coupling which is particularly adapted for use in a position which normally would prevent the use of a conventional two part (male and female) compression seal coupling. The present invention particularly relates to a coupling which has a conduit means (10, 20) with a threaded connector means (12, 22) rotatably mounted on it such that there is a fluid seal between them so that the connector means can be directly threaded into a threaded opening on an engine or the like without a second female connector.

PRIOR ART

The prior art has described many different types of couplings, particularly couplings for engines, which allow connection of flexible hoses to the engine. The conventional type of coupling includes a first female member into which a second male member is threaded so as to provide a compression seal on opposed conical surfaces between them. A conduit is mounted through the male member and is single or double flared for the compression onto the conical surface of the female member. The male member slides on the conduit before it is connected to the female member. In use an extension of the female member is threaded into an opening in the engine or the like. The male member and conduit is threaded into the female member to provide the compression seal. The compression seal has been thought to be necessary to prevent fluid leakage between the members.

Compression fittings are suitable for preventing leakage; however, the cramped area in many motor vehicle engine compartments has made such couplings more difficult to use. Also, the alignment of the male and female members is critical and threads are easily stripped as a result of misalignment. The compression fittings are relatively expensive to manufacture.

The prior art has provided quick disconnect type rotary fluid couplings; however, these are quite expensive and unsuitable for automotive use. Examples are U.S. Pat. Nos. 1,754,639; 2,226,826; 2,429,782; 2,952,482; 3,129,777; 2,642,297; 3,540,760; 3,718,350; 4,133,564; 4,193,616. Such couplings would not be suitable for a permanent fluid connection to an engine due to the risk of disconnection. Fluid couplings which are rotatable after they are installed are known in other arts, such as the coupling of U.S. Pat. No. 2,907,590, but it is not believed that they have been used in engines as far as applicant is aware.

In application Ser. No. 416,963, filed Sept. 13, 1982 by Thomas S. Krause and assigned to a common assignee, a rotatable fluid coupling is described. The present invention is an improvement on the Krause coupling.

OBJECTS

It is therefore an object of the present invention to provide a novel fluid coupling which can be directly threaded into an opening such as in an engine block. It is further an object of the present invention to provide a method for the manufacture of the coupling. Further still it is an object of the present invention to provide a coupling which is easy to manufacture and which is relatively inexpensive. These and other objects will become increasingly apparent by reference to the following description and to the drawings.

IN THE DRAWINGS

GENERAL DESCRIPTION

Figure 1:
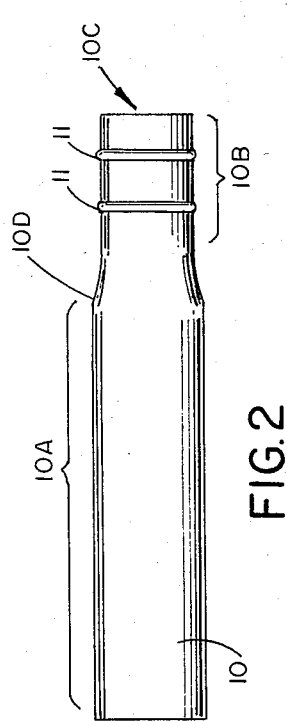
FIG. 1 is a front view of a conduit means (10), particularly showing an enlarged section (10A) and a reduced section (10B) with a shoulder (10D) between the sections.

The present invention relates to a fluid coupling which comprises:

conduit means (10, 20) with an enlarged section (10A, 20A) having a first outside cross-sectional width and having at one end (10C, 20C) a reduced section (10B, 20B) with a cylindrical exterior surface which has an outside diameter smaller than the width of the conduit means and with a truncated conical shoulder (10D, 20D) between the sections;

connector means (12, 22) mounted on the cylindrical surface adjacent the one end with (1) a first cylindrical interior opening (12A, 22A) adjacent a first end (12E, 22E) of the connector means having a first inside diameter to provide a precision rotational fit with a portion of the reduced section of the conduit means and (2) an enlarged second opening (12B, 22B) adjacent a second end (12F, 22F) of the connector means opposite the first end, the second opening being larger than the outside diameter of the exterior surface of the reduced section and smaller than the width of enlarged section of the conduit means, the connector means having an exterior threaded surface (12C, 22C) adapted to fit a mating threaded opening and having an exterior wrench engaging surface (12D, 22D) for threading the connector means into the threaded opening such that there is a sealed fluid connection with the conduit means;

retaining means (10F, 23) for rotatably holding the conduit means and connector means together such that the shoulder abuts adjacent to the second end of the connector means; and seal means (11, 21) between the exterior surface of the conduit means and the interior surface of the connector means.

The present invention further relates to the method of forming a fluid coupling at one end of a conduit means the improvement which comprises:

pressure forming an end of a cylindrical tube to provide a reduced section (10B, 20B) having cylindrical exterior surface with a reduced diameter from the diameter of the tube and with a truncated conically shaped shoulder (10D, 20D) between the tube and the reduced section;

mounting a connector means (12, 22) on the reduced section, the connector means having (1) a first cylindrical interior opening (12A, 22A) adjacent a first end (12E, 22E) of the connector means having a first inside diameter to provide a precision rotational fit to the exterior surface of the reduced section of the conduit means and (2) an enlarged second opening (12B, 22B) adjacent a second end of the connector means opposite the first end of the connector means, the second opening being larger than the outside diameter of the reduced section and smaller than the diameter of the tube, the connector means having an exterior threaded surface (12C, 22C) adapted to fit a threaded opening and having an exterior wrench engaging means (10D, 22D) for threading the connector means into the threaded opening such that there is a sealed fluid connection with the conduit means; and providing a retaining means (10F, 23) on the conduit means at the one end adjacent the connector means such that the shoulder abuts on the connector means.

As can be seen, the method of the present invention provides a coupling wherein the connector means is rotatable on the conduit means but is not longitudinally moveable along the axis of the conduit. The coupling of the present invention is thus quite different from the compression fittings of the prior art where the connector means slides on the conduit means prior to connection. The conduit means can rotate on the connector means when the coupling of the present invention is connected for use.

SPECIFIC DESCRIPTION

Figure 2:
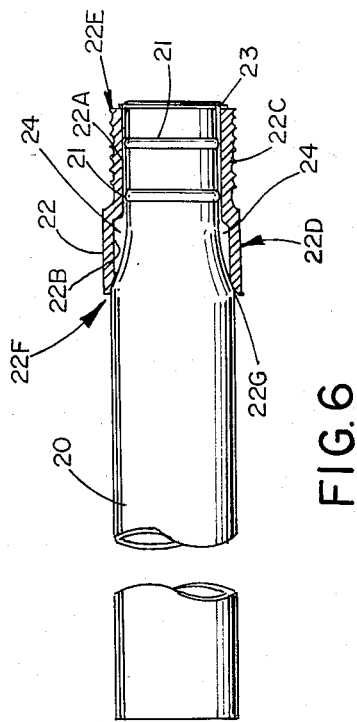
FIG. 2 is a front view of the conduit means (10) shown in FIG. 1 with o-rings (11) provided in grooves (10E) in the reduced section (10B).

Referring to FIGS. 1 to 4, a preferred embodiment of the fluid coupling of the present invention is shown. As shown in FIGS. 1 and 2 an enlarged section 10A is connected to a reduced section 10B adjacent one end 10C of a conduit 10 and separated by a truncated conical shoulder 10D. Grooves 10E are provided on the reduced section of the conduit 10 for mounting o-rings 11. The reduced section 10B is generally swagged on an end of a length of the enlarged section 10A of conduit 10 and then polished to provide a relatively smooth and regular cylindrical surface. The grooves 10E are generally rolled into the reduced section 10B.

Figure 3:
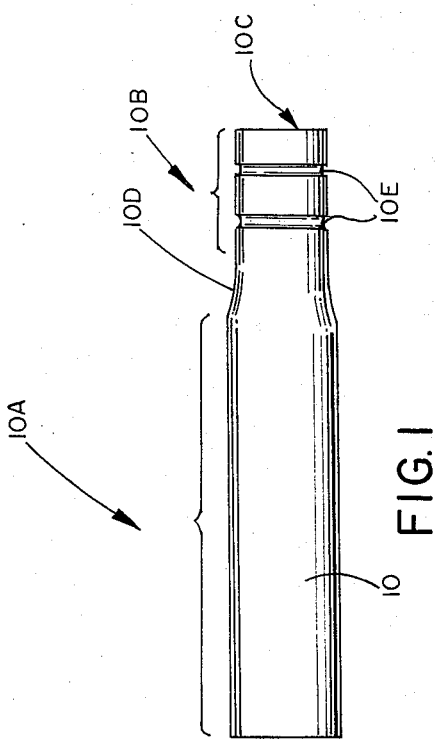
FIG. 3 is a front view of the fluid coupling of the present invention with the conduit means (10) shown in FIG. 2 with a connector means (12) shown in cross-section mounted on the reduced section (10B) and with an integral lip (10F) formed from a portion of the reduced section to hold the connector means (12) in position.
Figure 4:
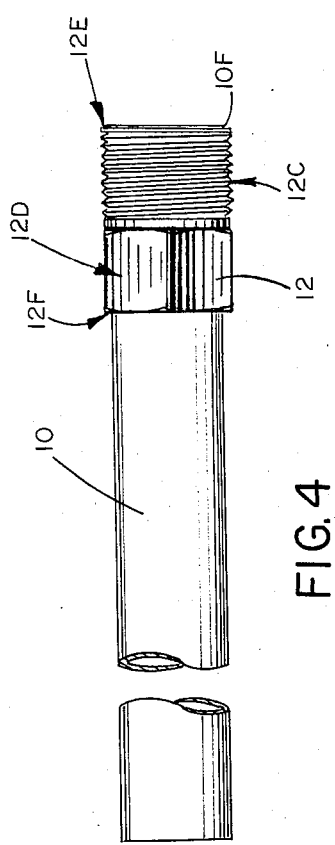
FIG. 4 is a front view of the fluid coupling of the present invention showing the assembled conduit means (10) and connector means (12).

As shown in FIGS. 3 and 4, a connector 12 is rotatably mounted on the reduced section (10A) adjacent a first end 12E of a cylindrical interior portion 12A of the connector 12. The interior portion 12A is in closely spaced relation to the exterior surface of the reduced section 10B. Adjacent the first end 12C is a lip 10F is formed from a portion of the reduced section 10A to hold the connector 12 in place on the conduit 10. A second end 12F of the connector 12 abuts on the shoulder 10D so that the connector 12 is prevented from moving longitudinally along the axis of the conduit 10.

The connector 12 has an enlarged portion 12B relative to the portion 12A, such that there is a space 13 between the shoulder 10D, and a portion of the reduced section 10B. This space is important in that there is no frictional engagement with the shoulder 10D except on a chamfered portion 12G (FIG. 3) of the connector 12. This construction provides ease of rotation of the conduit 10 on connector 12 when threads 12C are threaded into an opening (not shown). The space 13 can be packed although this is not necessary for low pressure applications.

The resulting fluid coupling which can easily be installed in a cramped space. The coupling is particularly useful in a setting where there is vibration which tends to loosen compression fittings such as with an engine. The coupling is especially useful for a cooling system where flexible cooling fluid hoses are connected to the coupling. The fluid coupling of FIGS. 1 to 4 has also been formed to be particularly useful for fuel lines to carburetors.

Figure 6:
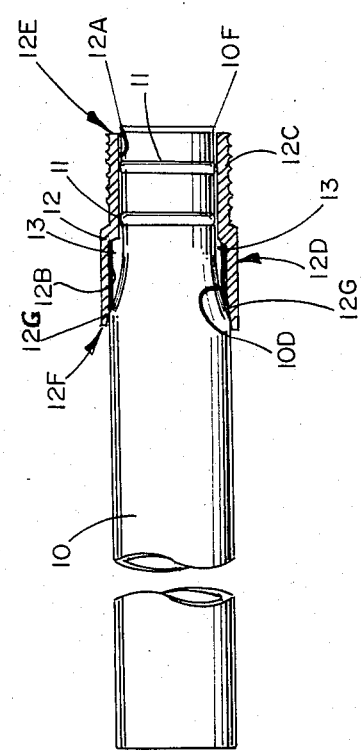
FIG. 6 is a front view of the assembled components of FIG. 5 particularly showing the snap ring (23) removeably holding the conduit means (20) and connector means (22) together.
Figure 5:
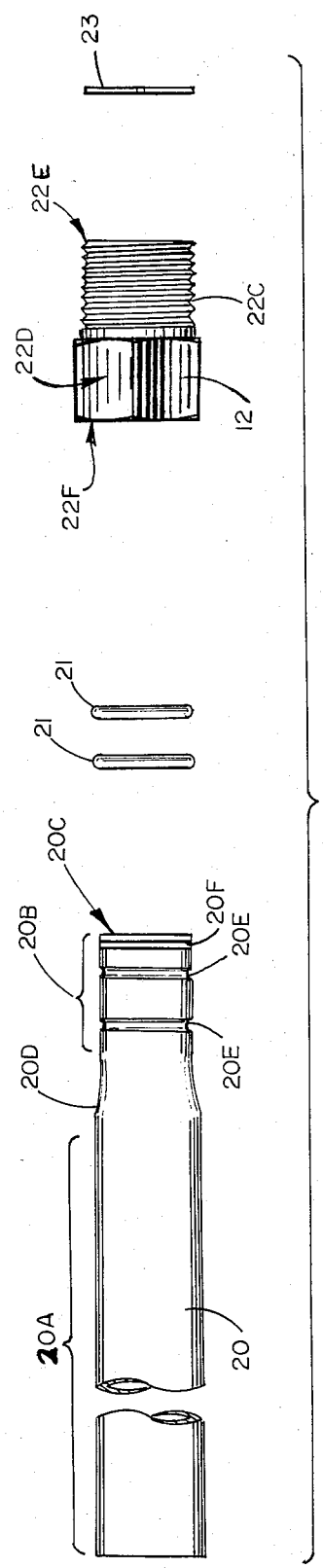
FIG. 5 is a front view of a second embodiment of the coupling of the present invention showing the separated components including conduit means (20) connector means (22) and a snap ring (23) to hold them together.

FIGS. 5 and 6 show a similar coupling with a conduit 20, having an enlarged section 20A, a reduced section 20B, an end 20C, shoulder 20D and grooves 20E. O-rings 21 are provided in grooves 20C for sealing. Connector 22 has a first interior cylindrical portion 22A, a second enlarged interior portion 22B, threads 22C, wrench engaging surfaces 22D and opposite ends 22E and 22F as in FIGS. 1 to 4. The difference in this embodiment is that the reduced section 22 has a groove 20F adjacent the one end 20C of the reduced section 20A which is adapted to receive a snap ring 23 to removeably hold the connector 22 on the reduced section 20A with the shoulder 20D abutting on chamfered portion 22G.

It was found that the construction of FIGS. 5 and 6 was preferred for high pressure hydraulic and brake line uses where the pressures were above about 500 psig. As can be seen, this construction also allows the o-rings 21 to be easily replaced by removing the snap ring 23.

The chamfered portions 12G or 22G of the connector 12 or 22 provides a narrow flat surface contact with the shoulder 10D or 20D. It is possible to eliminate the chamfer 12G or 22G and round the corners; however, it is preferred not to have a sharp edge at the end 12F or 22F of the connector 12 or 22 so as to provide ease of rotation of the connector 12 or 22 on the conduit 10 or 20 of the shoulder 12D or 22D.

The space 24 provides ease of rotation of the connector 22 on the conduit 20. The space 24 can be packed with a pump type packing; however this is not preferred, since the packing could make rotation more difficult.

As can be seen from the preceding description, the fluid coupling of the present invention eliminates the need for a second female fitting in a conventional compression coupling. The connector 12 or 22 is threaded by means of threads 12C or 22C directly into a corresponding threaded opening in an engine carburetor or the like. As can be seen, this construction reduces the space necessary for connection and reduces the risk of misalignment present with compression fitting members. The coupling can accommodate rotational movement of the conduit relative to the connector during installation and in use. The coupling is significantly less expensive than a two piece compression fitting.

There are numerous variations of the fluid coupling which will be apparent to those skilled in the art. Various retaining means can be used in place of the lip 10F or snap ring 23. Other sealing means besides the o-rings 11 or 21 can be used. All of these variations are intended to be within the scope of the present invention.

I claim:
1. A fluid coupling which comprises:
  (a) conduit means (10, 20) with an enlarged section (10A, 20A) having a first outside cross-sectional width and having at one end (10C, 20C) a reduced section (10B, 20B) with a cylindrical exterior surface which has an outside diameter smaller than the width of the conduit means and with a truncated conical shoulder (10D, 20D) between the sections;

(b) connector means (12, 22) mounted on the cylindrical surface adjacent the one end with (1) a first cylindrical interior opening (12A, 22A) adjacent a first end (12E, 22E) of the connector means having a first inside diameter to provide a precision rotational fit with a portion of the reduced section of the conduit means and (2) an enlarged second opening (12B, 22B) adjacent a second end (12F, 22F) of the connector means opposite the first end, the second opening being larger than the outside diameter of the exterior surface of the reduced section and smaller than the width of enlarged section of the conduit means, the connector means having an exterior threaded surface (12C, 22C) adapted to fit a mating threaded opening and having an exterior wrench engaging surface (12D, 22D) for threading the connector means into the threaded opening such that there is a sealed fluid connection with the conduit means;

(c) retaining means (10F, 23) for rotatably holding the conduit means and connector means together such that the shoulder abuts the connector means adjacent to second end; and (d) seal means (11, 21) between and in sealing engagement with the exterior surface of the conduit means and the interior surface of the connector means.

2. The coupling of claim 1 wherein the retaining means is an integral lip (10F) extending from the exterior cylindrical surface at the first end of the reduced section of the conduit means which engages the first end of the connector means to hold the connector means and conduit means together.

3. The coupling of claim 1 wherein the retaining means is a C shaped snap ring (23) which engages a groove adjacent the first end of connector means to hold the connector means and conduit means together.

4. The coupling of claim 1 wherein the sealing means is at least one o-ring (11, 21) mounted in a groove (10E, 20E) provided on the cylindrical exterior surface of the conduit means which engages the first cylindrical interior portion of the connector means.

5. The coupling of claim 4 wherein there are two spaced apart grooves mounting two o-rings.

6. The coupling of claim 1 wherein the cylindrical exterior surface of the reduced section of the conduit means and shoulder have been pressure formed on a cylindrically cross-sectioned conduit means and then the exterior surface has been polished to the outside diameter.

7. The coupling of claim 1 wherein the conduit means is a tube (10A) with a circular inside and outside diameter.

8. The coupling of claim 1 for mounting on an internal combustion engine with a flexible hose connection.

9. The coupling of claim 1 wherein the shoulder on the conduit means abuts on the second end of the connector means.

10. The coupling of claim 1 wherein the second end of the connector means is chamfered (12G, 22G) to abut with the shoulder on the conduit means.

* * * * *